United States Patent
Miao et al.

(10) Patent No.: US 12,153,137 B2
(45) Date of Patent: Nov. 26, 2024

(54) METHOD FOR COORDINATE ERROR CORRECTION WITH A THREE-DIMENSIONAL LIDAR SCANNER

(71) Applicant: BEIJING AEROSPACE INSTITUTE FOR METROLOGY AND MEASUREMENT TECHNOLOGY, Beijing (CN)

(72) Inventors: Yinxiao Miao, Beijing (CN); Chenxing Bao, Beijing (CN); Ke Liu, Beijing (CN); Kailei Wang, Beijing (CN); Tianmao Guo, Beijing (CN); Xiaoguang Wang, Beijing (CN)

(73) Assignee: BEIJING AEROSPACE INSTITUTE FOR METROLOGY AND MEASUREMENT TECHNOLOGY, Beijing (CN)

( * ) Notice: Subject to any disclaimer, the term of this patent is extended or adjusted under 35 U.S.C. 154(b) by 438 days.

(21) Appl. No.: 17/488,641

(22) Filed: Sep. 29, 2021

(65) Prior Publication Data
US 2022/0018960 A1    Jan. 20, 2022

(30) Foreign Application Priority Data
Nov. 27, 2020    (CN) .......................... 202011352856.7

(51) Int. Cl.
*G01S 17/42*    (2006.01)
*G01S 7/481*    (2006.01)
*G01S 7/497*    (2006.01)

(52) U.S. Cl.
CPC ............ *G01S 17/42* (2013.01); *G01S 7/4814* (2013.01); *G01S 7/4817* (2013.01); *G01S 7/497* (2013.01)

(58) Field of Classification Search
None
See application file for complete search history.

(56) References Cited

U.S. PATENT DOCUMENTS

| | | | |
|---|---|---|---|
| 2020/0116836 A1* | 4/2020 | Pacala | ............... H01L 27/14645 |
| 2020/0264313 A1* | 8/2020 | Newman | ............... G01S 17/003 |

FOREIGN PATENT DOCUMENTS

| | | |
|---|---|---|
| CN | 106597417 A | 4/2017 |
| CN | 107290734 A | 10/2017 |

* cited by examiner

*Primary Examiner* — Raul J Rios Russo
*Assistant Examiner* — Carl F. R. Tchatchouang

(57) ABSTRACT

A method for coordinate error correction with a three-dimensional (3D) lidar scanner. The error source that affects the measurement accuracy of the three-dimensional coordinate is determined by building an error model, and then the error is modified to improve the measurement accuracy of the three-dimensional lidar scanner. The error correction method includes: building a theoretical calculation model, analyzing the source of measurement error, building an error model, solving the error model and implementing coordinate correction. During building the error model, 26 error factors are considered to obtain a calculation expression of the three-dimensional Cartesian coordinate. The calculation expression includes the amount of errors, the azimuth angle, the pitch angle and the distance.

5 Claims, 3 Drawing Sheets

METHOD FOR COORDINATE ERROR CORRECTION WITH A THREE-DIMENSIONAL LIDAR SCANNER

CROSS-REFERENCE TO RELATED APPLICATIONS

This application claims the benefit of priority from Chinese Patent Application No. 202011352856.7, filed on Nov. 27, 2020. The content of the aforementioned application, including any intervening amendments thereto, is incorporated herein by reference in its entirety.

TECHNICAL FIELD

This application relates to a method for coordinate error correction, in particular to a method for spatial geometric coordinate error correction of a three-dimensional (3D) lidar scanner, and belongs to the technical field of lidar measurement.

BACKGROUND

A three-dimensional (3D) lidar scanner is a large-sized instrument that measures spatial coordinate for the non-contact scanning measurement on a surface of a large object. The Lidar-derived 3D point cloud data can be used for 3D reverse modeling or dimensional tolerance evaluation.

The 3D lidar scanner includes an azimuth angle measurement module, a pitch angle measurement module, a laser range measurement module, and a measurement light reflector module. These modules require specific geometric and positional relationships, which is however hard to achieve in the processes of manufacturing, installation, handling and use of components of the lidar scanner. This, in turn, will affect the accuracy of coordinate measurement by the 3D lidar scanner, so it is necessary to compensate and correct the spatial geometric errors of the components. It is very important to study the error model of the 3D lidar scanner and realize coordinate correction to improve the measurement accuracy of this type of the measuring instrument.

The existing methods for error correction of the 3D lidar scanner lack the error correction for the geometric structure coordinates of the 3D lidar scanner.

SUMMARY

In view of this, the present disclosure proposes a method for coordinate error correction of a three-dimensional (3D) lidar scanner, by building an error model to determine the error source that affects its 3D coordinate measurement accuracy, and then correcting the error to improve the measurement accuracy of the 3D lidar scanner.

The method for coordinate error correction with a three-dimensional (3D) lidar scanner includes:
S1: building a theoretical calculation model of a three-dimensional coordinate of a measured point and a azimuth angle, a pitch angle and a distance of the measured point collected by the 3D lidar scanner;
S2: analyzing a source of measurement error including errors from installation of the laser ranging module, the azimuth angle measurement module, the pitch angle measurement module and the reflector module of the 3D lidar scanner, and determining an error factor including N terms;
S3: building an error model by analyzing a relationship between each of the errors obtained in step S2 and the three-dimensional coordinate of the measured point to generate a calculation expression of a three-dimensional Cartesian coordinate including N error factors, the azimuth angle, the pitch angle and the distance;
S4: solving the error model by setting a calibration point group within a gamut of the distance, the azimuth angle, and the pitch angle of the three-dimensional scanning lidar, wherein the number of calibration points in the calibration point group is not less than N; obtaining a distance, a azimuth angle, and a pitch angle of each of the calibration points through the three-dimensional lidar scanner; using high-precision coordinate measuring instrument to measure each of the calibration points in the calibration point group to obtain a three-dimensional coordinate of each of the calibration points; and
substituting the three-dimensional coordinate of each of the calibration points obtained by the high-precision measuring instrument and the distance, the azimuth angle, and the pitch angle of each of the calibration points measured by the three-dimensional lidar scanner into the error model in step S3 to solve the error factors in the error model and to obtain a corrected three-dimensional coordinate calculation formula; and
S5: substituting the distance, the azimuth angle, and the pitch angle of the measured point into the corrected three-dimensional coordinate calculation formula obtained in step S4 to realize a correction of the three-dimensional coordinate of the three-dimensional lidar scanner.

In a preferred embodiment, in step S1:
supposing that the three-dimensional coordinate of the measured point is (x, y, z), and that the azimuth angle, the pitch angle, and the distance of the measured point obtained by the three-dimensional lidar scanner are $\alpha$, $\beta$, and L respectively, the theoretical calculation model is:

$$\begin{cases} x = L \cos \beta \cos \alpha \\ y = L \cos \beta \sin \alpha \\ z = L \sin \beta \end{cases}$$

wherein the theoretical calculation model is expressed as $P(x, y, z) = f(\alpha, \beta, L)$.

In a preferred embodiment, in step S2:
supposing that installation of each of modules of the three-dimensional lidar scanner introduce six installation errors which are deviations and deflection angles, along x, y and z axes in the three-dimensional coordinate, between an actual installation position and a theoretical position, error factors comprising 24 items are thus determined.

In a preferred embodiment, the error factors further include an azimuth angle measurement error and a pitch angle measurement error. The error factors include 26 items.

In a preferred embodiment, in step S3:
the error model is:

$$P'(x, y, z) = f' \left( \begin{bmatrix} {}^1\delta x \\ {}^1\delta y \\ {}^1\delta z \\ {}^1\delta \alpha \\ {}^1\delta \beta \\ {}^1\delta \gamma \end{bmatrix} \begin{bmatrix} {}^2\delta x \\ {}^2\delta y \\ {}^2\delta z \\ {}^2\delta \alpha \\ {}^2\delta \beta \\ {}^2\delta \gamma \end{bmatrix} \begin{bmatrix} {}^3\delta x \\ {}^3\delta y \\ {}^3\delta z \\ {}^3\delta \alpha \\ {}^3\delta \beta \\ {}^3\delta \gamma \end{bmatrix} \begin{bmatrix} {}^4\delta x \\ {}^4\delta y \\ {}^4\delta z \\ {}^4\delta \alpha \\ {}^4\delta \beta \\ {}^4\delta \gamma \end{bmatrix} \begin{bmatrix} \delta_{\theta 1} \\ \delta_{\theta 2} \end{bmatrix} (\alpha, \beta, L) \right) = f'(\delta_\chi)(\alpha, \beta, L),$$

where $\delta\chi$ represents all the introduced error factors, $f'(\delta\chi)$ is an analytical expression related to the error factors; $^1\delta x$, $^1\delta y$, $^1\delta z$, $^1\delta\alpha$, $^1\delta\beta$, $^1\delta\gamma$ represent six installation errors for the azimuth angle measurement module; $^2\delta x$, $^2\delta y$, $^2\delta z$, $^2\delta\alpha$, $^2\delta\beta$, $^2\delta\gamma$ represent six installation errors for the pitch angle measurement module; $^3\delta x$, $^3\delta y$, $^3\delta z$, $^3\delta\alpha$, $^3\delta\beta$, $^3\delta\gamma$ represent six installation errors for the reflector module; $^4\delta x$, $^4\delta y$, $^4\delta z$, $^4\delta\alpha$, $^4\delta\beta$, $^4\delta\gamma$ represent six installation errors for the laser ranging module; $\delta_{\theta 1}$ represents azimuth measurement error; and $\delta_{\theta 2}$ represents the pitch angle measurement error.

In a preferred embodiment, the high-precision coordinate measuring instrument in step S4 is a laser tracker.

Beneficial Effects (1) The error model of the 3D lidar scanner is built to determine the error source that affects the measurement accuracy of the 3D coordinate, thereby providing a basis for error correction.

(2) After the error source is determined, the spatial geometric errors of the components of the 3D lidar scanner are compensated and corrected, which can effectively improve the measurement accuracy of the 3D lidar scanner.

DETAILED DESCRIPTION OF EMBODIMENTS

In the following, the present disclosure will be further described in detail with reference to the accompanying drawings and embodiments.

This embodiment provides a method for correction for errors of three-dimensional coordinate measurement with a large-sized three-dimensional (3D) lidar scanner. In the method according to this embodiment, an error model of a 3D lidar scanner is built and then solved through a calibration point group and a third-party device, and an analytical expression for coordinate correction is generated to realize the coordinate correction.

Figure 1:
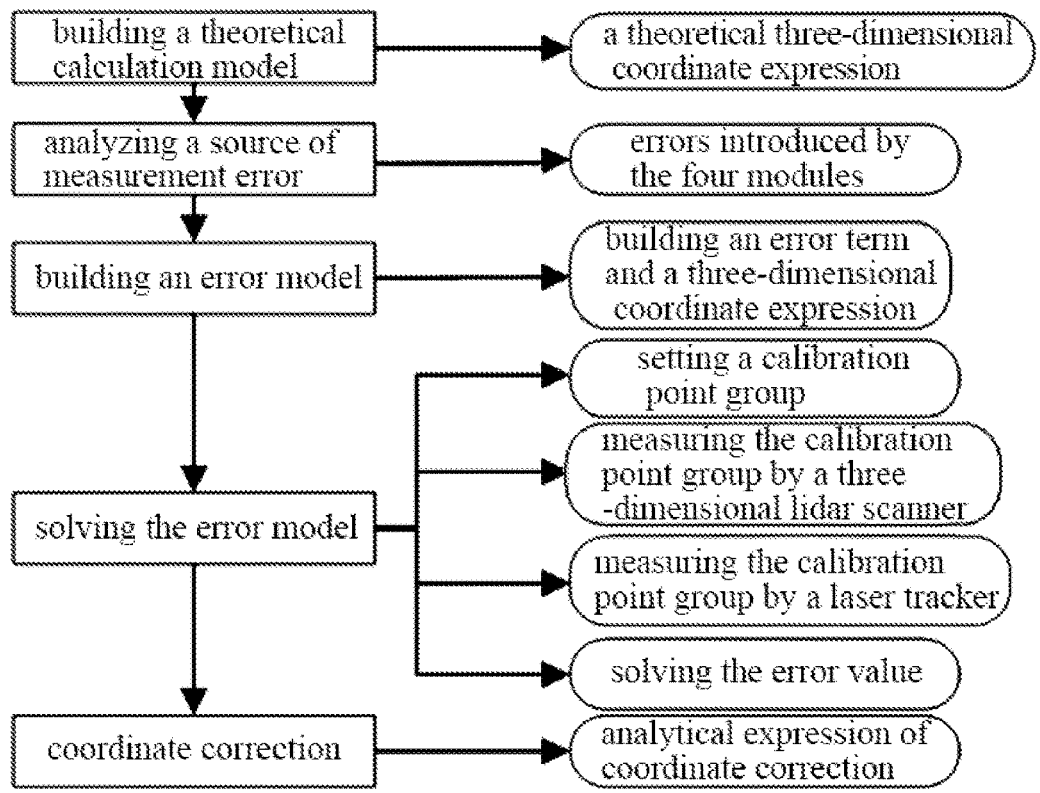
FIG. 1 is a flowchart of an error correction method in accordance with an embodiment of the present disclosure.

A method for coordinate error correction is performed according to the steps as illustrated in FIG. 1.

S1: Building of a Theoretical Calculation Model

Figure 2:
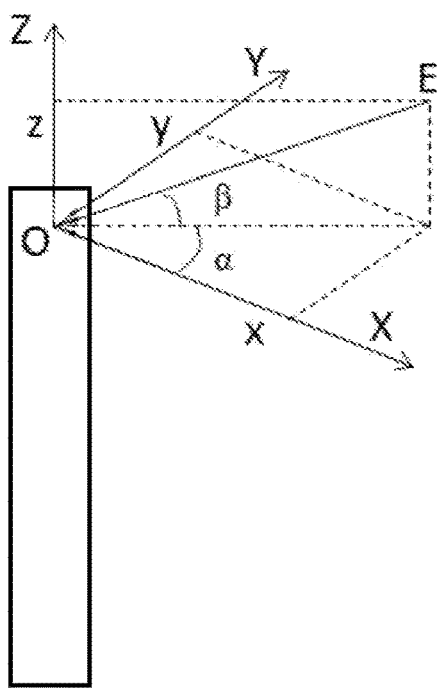
FIG. 2 is a schematic diagram of a theoretical calculation model of a 3D lidar scanner in accordance with an embodiment of the present disclosure.

A 3D lidar scanner includes a laser ranging module, an azimuth angle measurement module, a pitch angle measurement module, and a reflector module. As shown in FIG. 2, point O is an origin of a coordinate system of the 3D lidar scanner, and point E is a measured point. The 3D lidar scanner collects a distance L of an optical axis OE, and an angle $\alpha$ (azimuth angle) and an angle $\beta$ (pitch angle) between the optical axis OE and two scanning axes (X-axis and Y-axis). 3D coordinate (x, y, z) of the measured point E is calculated based on a geometric relationship. A theoretical calculation model of the azimuth angle, the pitch angle, the distance and 3D Cartesian coordinates is built.

The theoretical calculation model is the conversion of a Cartesian coordinate system to a spherical coordinate. Supposing the 3D coordinate of the measured point E is (x, y, z), the distance of from the measured point E to the origin O of the coordinate system of the 3D lidar scanner is L, the corresponding azimuth angle is $\alpha$, and the corresponding pitch angle is $\beta$, the theoretical calculation model is:

$$\begin{cases} x = L \cos\beta \cos\alpha \\ y = L \cos\beta \sin\alpha \\ z = L \sin\beta \end{cases},$$

wherein the theoretical calculation model is expressed as $P(x, y, z) = f(\alpha, \beta, L)$.

S2: Analysis of the Source of Measurement Error

The 3D lidar scanner consists of four modules: the laser ranging module, the azimuth angle measurement module, the pitch angle measurement module, and the reflector module. These modules will inevitably cause installation errors during installation. Particularly, a deviation $\delta x$ in the x-axis direction, a deviation $\delta y$ in the y-axis direction, and a deviation $\delta z$ in the z-axis direction, a deflection angle $\delta\alpha$ relative to the x axis, a deflection angle $\delta\beta$ relative to the y axis, and a deflection angle $\delta\gamma$ relative to the z axis between an actual installation position and a theoretical position.

In addition, an azimuth angle measurement error is $\delta_{\theta 1}$, and a pitch angle measurement error is $\delta_{\theta 2}$. A laser ranging measurement error has been compensated in the laser ranging module, so the measurement error for the laser ranging module is not considered in the model. In summary, building an error model needs to take into account 26 error factors.

Considering the error factor, the calculation model is expressed as $P'(x, y, z) = f'(\alpha, \beta, L)$, where $f'(\alpha, \beta, L)$ is an analytical expression that considers 26 error factors.

S3: Building of an Error Model

A relationship between each of the errors obtained in step S2 and the three-dimensional coordinate of the measured point is analyzed to generate a calculation expression of a three-dimensional Cartesian coordinate including the error amount, the azimuth angle, the pitch angle, and the distance.

Figure 3:
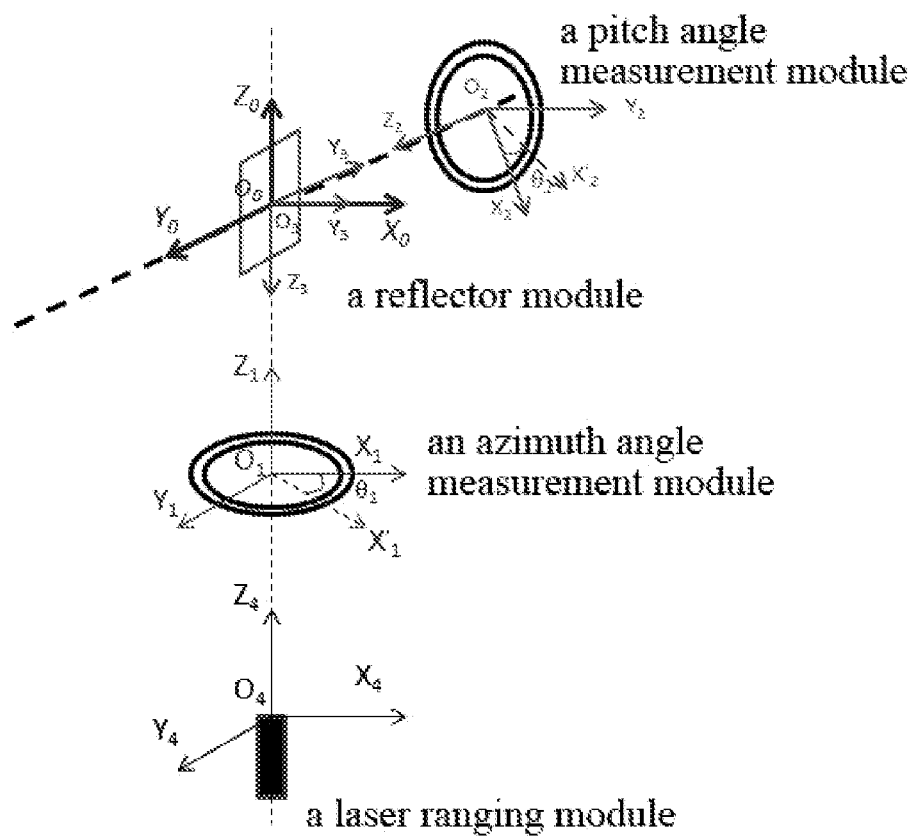
FIG. 3 is a schematic diagram of an error analysis model of the 3D lidar scanner in accordance with an embodiment of the present disclosure.
Figure 4:
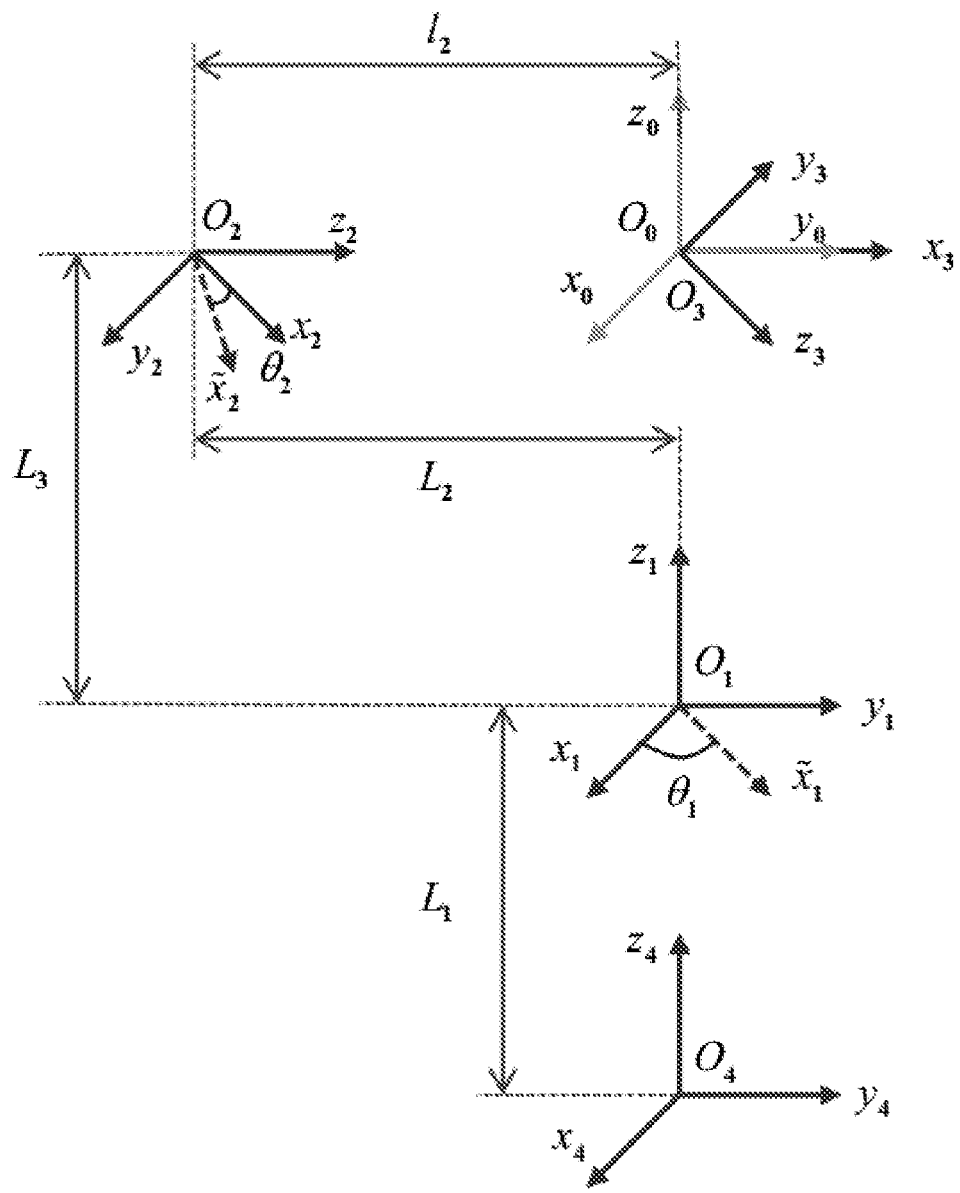
FIG. 4 is a schematic diagram of a coordinate system of a theoretical model of the 3D lidar scanner in accordance with an embodiment of the present disclosure.

As shown in FIGS. 2-4, five coordinate systems has been built in the error model, which are identified as coordinate systems 0, 1, 2, 3 and 4, respectively. Coordinate system 0 is a reference coordinate system of the 3D lidar scanner. Coordinate system 1 is a coordinate system for the azimuth measurement module. Coordinate system 2 is a coordinate system for the pitch angle measurement module. Coordinate system 3 is a coordinate system for the reflector module. Coordinate system 4 is a coordinate system for the laser ranging module. Each of the coordinate systems is a reference for the installation of respective modules. The installation error of each of the coordinate systems is an integral part of the entire error model. $L_1$, $L_2$, $L_3$, and $l_2$ reflect a relative positional relationship between modules in terms of their theoretical installation positions. $L_1$ is a theoretical installation distance between the laser ranging module and the azimuth angle measurement module in the vertical direction (that is, the distance between the coordinate origins of the respective coordinate systems). $L_2$ is a theoretical installation distance between the azimuth measurement module and the pitch angle measurement module in the horizontal direction. $L_3$ is a theoretical installation distance between the azimuth measurement module and the pitch angle measurement module in the vertical direction. $l_2$ is a theoretical installation distance between the pitch angle measurement module and the reflector module in the horizontal direction. The 3D coordinates considering the errors are expressed as (that is, the error model):

$$P'(x,y,z) = f'\left(\begin{bmatrix} {}^1\delta x \\ {}^1\delta y \\ {}^1\delta z \\ {}^1\delta \alpha \\ {}^1\delta \beta \\ {}^1\delta \gamma \end{bmatrix}\begin{bmatrix} {}^2\delta x \\ {}^2\delta y \\ {}^2\delta z \\ {}^2\delta \alpha \\ {}^2\delta \beta \\ {}^2\delta \gamma \end{bmatrix}\begin{bmatrix} {}^3\delta x \\ {}^3\delta y \\ {}^3\delta z \\ {}^3\delta \alpha \\ {}^3\delta \beta \\ {}^3\delta \gamma \end{bmatrix}\begin{bmatrix} {}^4\delta x \\ {}^4\delta y \\ {}^4\delta z \\ {}^4\delta \alpha \\ {}^4\delta \beta \\ {}^4\delta \gamma \end{bmatrix}\begin{bmatrix} \delta_{\theta 1} \\ \delta_{\theta 2} \end{bmatrix}\right)(\alpha, \beta, L) = f'(\delta_\chi)(\alpha, \beta, L),$$

where $\delta\chi$ represents all the introduced error factors, $f'(\delta\chi)$ is an analytical expression related to the error factors; $^1\delta x$, $^1\delta y$, $^1\delta z$, $^1\delta\alpha$, $^1\delta\beta$, $^1\delta\gamma$ represent six installation errors of the azimuth angle measurement module; $^2\delta x$, $^2\delta y$, $^2\delta z$, $^2\delta\alpha$, $^2\delta\beta$, $^2\delta\gamma$ represent six installation errors of the pitch angle measurement module; $^3\delta x$, $^3\delta y$, $^3\delta z$, $^3\delta\alpha$, $^3\delta\beta$, $^3\delta\gamma$ represent six installation errors of the reflector module; $^4\delta x$, $^4\delta y$, $^4\delta z$, $^4\delta\alpha$, $^4\delta\beta$, $^4\delta\gamma$ represent six installation errors of the laser ranging module. The above installation errors are the installation errors (that is, the deviation from its theoretical installation position) of each of the modules in its own coordinate system.

S4: Solving the Error Model

A calibration point group is set that includes multiple calibration points in a full range of the measurement distance, the azimuth angle, and the pitch angle of the 3D lidar scanner. The 3D lidar scanner is used to obtain the distance and the azimuth angle and the pitch angle of each of the calibration points. The coordinate measuring instrument such as a laser tracker is used to measure each calibration point in the calibration point group to obtain the 3D coordinates (x, y, z) of each of the calibration points. The measurement data of the 3D lidar scanner and the measurement data of the laser tracker are used to solve the various error values in the model. Particularly, S41: A set of calibration point groups is set that includes multiple calibration points within the full range of the measurement distance, the azimuth angle, and the pitch angle of the 3D lidar scanner. The number of calibration points in each of the calibration point groups is not be less than 26 (that is not less than the number of terms of the error factor determined in step S2). A steel ball with a diameter of 38.1 mm is used as a calibration point.

S42: The 3D lidar scanner is used to obtain the azimuth angle, the pitch angle and the distance of each of the calibration points.

S43: The Leica laser tracker is used as a high-precision measuring instrument to obtain the 3D Cartesian coordinate (x, y, z) of each of the calibration points. The laser tracker in this step can also be replaced by other measuring instruments of the same level.

S44: The 3D coordinates (x, y, z) of each of the calibration points obtained by the high-precision measuring instrument and each of the calibration points ($\alpha$, $\beta$, L) measured by the 3D lidar scanner are plugged into the error model built in step S3. A set of simultaneous equations with 26 unknown errors can be obtained, and the corresponding error can be obtained by solving the equations, and the analytical expression $f'(\delta\chi)$ for coordinate correction can be obtained, and then the coordinate correction calculation formula, as illustrated below, can be obtained:

$$P'(x,y,z) = f'(\delta\chi)(\alpha, \beta, L).$$

S5: Coordinate Correction

The distance, the azimuth angle, and the pitch angle of the measured point is substituted into the corrected three-dimensional coordinate calculation formula obtained in step S4 to realize the correction of the three-dimensional coordinate of the three-dimensional lidar scanner.

Although the present invention has been described in detail with general descriptions and specific examples above, it is obvious to those skilled in the art that some modifications or improvements can be made on the basis of the present disclosure. Therefore, these modifications or improvements made without departing from the spirit of the present invention fall within the scope as defined by the appended claims.

What is claimed is:

1. A method for coordinate error correction with a three-dimensional (3D) lidar scanner, the 3D lidar scanner comprising one or more processors, a laser ranging module, an azimuth angle measurement module, a pitch angle measurement module and a reflector module, wherein the laser ranging module, the azimuth angle measurement module, the pitch angle measurement module and the reflector module are installed in respective positions of the 3D lidar scanner to form actual installation positions;

the method comprising:

S1: building, by the one or more processors, a theoretical calculation model of a three-dimensional coordinate of a measured point and an azimuth angle, a pitch angle and a distance of the measured point;

S2: analyzing, by the one or more processors, a source of measurement error comprising errors between the actual installation positions and theoretical installation positions of the laser ranging module, the azimuth angle measurement module, the pitch angle measurement module and the reflector module of the 3D lidar scanner, and determining, by the one or more processors, an error factor comprising N terms;

S3: building an error model, by the one or more processors, by analyzing a relationship between each of the errors obtained in step S2 and the three-dimensional coordinate of the measured point to generate a calculation expression of a three-dimensional Cartesian coordinate comprising N error factors, the azimuth angle, the pitch angle and the distance;

S4: solving the error model, by the one or more processors, by setting a calibration point group within a full range of the distance, the azimuth angle, and the pitch angle of the three-dimensional scanning lidar, wherein the number of calibration points in the calibration point group is not less than N;

obtaining, by the 3D lidar scanner, a distance, an azimuth angle, and a pitch angle of each of the calibration points, and obtaining, by a laser tracker, each of the calibration points in the calibration point group to obtain a three-dimensional coordinate of each of the calibration points; and substituting, by the one or more processors, the three-dimensional coordinate of each of the calibration points obtained by the laser tracker, and the distance, the azimuth angle and the pitch angle of each of the calibration points obtained by the 3D lidar scanner into the error model in step S3 to obtain the error factors in the error model, and obtaining a corrected three-dimensional coordinate calculation formula; and S5: substituting, by the one or more processors, the distance, the azimuth angle, and the pitch angle of the measured point into the corrected three-dimensional coordinate calculation formula obtained in step S4, and generating, by the 3D lidar scanner, a corrected three-dimensional coordinate.

2. The method of claim 1, wherein in step S1:

the three-dimensional coordinate of the measured point is (x, y, z), and the azimuth angle, the pitch angle, and the distance of the measured point obtained by the three-dimensional lidar scanner are $\alpha$, $\beta$, and L respectively, the theoretical calculation model is:

$$\begin{cases} x = L \cos \beta \cos \alpha \\ y = L \cos \beta \sin \alpha \\ z = L \sin \beta \end{cases};$$

wherein the theoretical calculation model is expressed as P(x, y, z)=f ($\alpha$, $\beta$, L).

3. The method of claim 1, wherein in step S2:

introducing, by the one or more processors, six installation errors to installation of each of modules of the three-dimensional lidar scanner, wherein the six installation errors are deviations and deflection angles along x, y and z axes of the three-dimensional coordinate between an actual installation position and a theoretical position, the error factors comprising 24 items are determined.

4. The method of claim 3, wherein the error factors further comprise an azimuth angle self-measurement error and a pitch angle self-measurement error; and the error factors comprise 26 items.

5. The method of claim 4, wherein in step S3, the error model is expressed as $$P'(x, y, z) = f'\left(\begin{bmatrix} {}^1\delta x \\ {}^1\delta y \\ {}^1\delta z \\ {}^1\delta \alpha \\ {}^1\delta \beta \\ {}^1\delta \gamma \end{bmatrix}\begin{bmatrix} {}^2\delta x \\ {}^2\delta y \\ {}^2\delta z \\ {}^2\delta \alpha \\ {}^2\delta \beta \\ {}^2\delta \gamma \end{bmatrix}\begin{bmatrix} {}^3\delta x \\ {}^3\delta y \\ {}^3\delta z \\ {}^3\delta \alpha \\ {}^3\delta \beta \\ {}^3\delta \gamma \end{bmatrix}\begin{bmatrix} {}^4\delta x \\ {}^4\delta y \\ {}^4\delta z \\ {}^4\delta \alpha \\ {}^4\delta \beta \\ {}^4\delta \gamma \end{bmatrix}\begin{bmatrix} \delta_{\theta 1} \\ \delta_{\theta 2} \end{bmatrix}\right)(\alpha, \beta, L) = f'(\delta_\chi)(\alpha, \beta, L),$$

where $\delta\chi$ represents all the introduced error factors, $f'(\delta\chi)$ is an analytical expression related to the error factors; ${}^1\delta x$, ${}^1\delta y$, ${}^1\delta z$, ${}^1\delta a$, ${}^1\delta\beta$, ${}^1\delta\gamma$ represent six installation errors for the azimuth angle measurement module; ${}^2\delta x$, ${}^2\delta y$, ${}^2\delta z$, ${}^2\delta a$, ${}^2\delta\beta$, ${}^2\delta\gamma$ represent six installation errors for the pitch angle measurement module; ${}^3\delta x$, ${}^3\delta y$, ${}^3\delta z$, ${}^3\delta a$, ${}^3\delta\beta$, ${}^3\delta\gamma$ represent six installation errors for the reflector module; ${}^4\delta x$, ${}^4\delta y$, ${}^4\delta z$, ${}^4\delta a$, ${}^4\delta\beta$, ${}^4\delta\gamma$ represent six installation errors for the laser ranging module; $\delta_{\theta 1}$ represents azimuth measurement error; and $\delta_{\theta 2}$ represents the pitch angle measurement error.

* * * * *